(12) United States Patent
Bogner et al.

(10) Patent No.: US 12,208,451 B2
(45) Date of Patent: Jan. 28, 2025

(54) METHOD OF APPLYING A PLURALITY OF ENERGY BEAMS IN ADDITIVE MANUFACTURING

(71) Applicant: Siemens Energy Global GmbH & Co. KG, Bayern (DE)

(72) Inventors: Jan Pascal Bogner, Berlin (DE); David Rule, Seattle, WA (US); Julius Schurb, Berlin (DE); Fabio Witte, Gävle (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 436 days.

(21) Appl. No.: 17/764,091

(22) PCT Filed: Jul. 30, 2020

(86) PCT No.: PCT/EP2020/071468
§ 371 (c)(1),
(2) Date: Mar. 25, 2022

(87) PCT Pub. No.: WO2021/069124
PCT Pub. Date: Apr. 15, 2021

(65) Prior Publication Data
US 2022/0402039 A1    Dec. 22, 2022

(30) Foreign Application Priority Data
Oct. 11, 2019  (EP) .................................... 19202655

(51) Int. Cl.
*B22F 12/45*    (2021.01)
*B22F 10/28*    (2021.01)
(Continued)

(52) U.S. Cl.
CPC .............. *B22F 12/45* (2021.01); *B22F 10/28* (2021.01); *B22F 10/366* (2021.01); *B22F 10/85* (2021.01);
(Continued)

(58) Field of Classification Search
None
See application file for complete search history.

(56) References Cited

U.S. PATENT DOCUMENTS

| 9,138,807 B1 | 9/2015 | Takezawa |
| 2018/0207871 A1 | 7/2018 | Miki |

(Continued)

FOREIGN PATENT DOCUMENTS

| CN | 106042390 A | 10/2016 |
| DE | 102015216402 A1 * | 3/2017 |

(Continued)

OTHER PUBLICATIONS

PCT International Search Report and Written Opinion of International Searching Authority mailed Oct. 21, 2020 corresponding to PCT International Application No. PCT/EP2020/071468 filed Jul. 30, 2020.

*Primary Examiner* — Anthony M Liang
(74) *Attorney, Agent, or Firm* — Wolter Van Dyke Davis, PLLC (57) ABSTRACT

A method of applying a plurality of energy beams in the additive manufacture of a component includes a) providing a first and a second energy beam, each set up for the irradiation of a layer of a powder bed, wherein the first beam scans over a first irradiation area and the second beam scans over a second irradiation area, wherein the first and second irradiation areas are substantially arranged adjacent to each other and form part of a manufacturing plane, and b) assigning a scan vector to be scanned in the first irradiation area by the second energy beam, when a melt pool generated by the second energy beam during the scan of the vector is expected to cause less overlap with a powder bed outside of the component's geometry than a melt pool generated by the first energy beam would cause during the scan of the vector.

15 Claims, 4 Drawing Sheets

(51) Int. Cl.
*B22F 10/366* (2021.01)
*B22F 10/85* (2021.01)
*B22F 12/41* (2021.01)
*B33Y 10/00* (2015.01)
*B33Y 30/00* (2015.01)
*B33Y 50/02* (2015.01)

(52) U.S. Cl.
CPC .............. *B22F 12/41* (2021.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2019/0022795 A1 | 1/2019 | Bauer et al. |
| 2019/0283332 A1 | 9/2019 | Brown |
| 2020/0353679 A1 | 11/2020 | Geisen |

FOREIGN PATENT DOCUMENTS

| | | |
|---|---|---|
| DE | 202018000735 U1 | 3/2018 |
| DE | 102017202088 A1 | 8/2018 |
| EP | 2601006 B1 | 6/2014 |
| EP | 3351323 A1 | 7/2018 |
| EP | 3007879 B1 | 2/2019 |
| WO | 2012097799 A2 | 7/2012 |
| WO | 2014199134 A1 | 12/2014 |
| WO | 2019068455 A1 | 4/2019 |
| WO | 2019226983 A1 | 11/2019 |

* cited by examiner

METHOD OF APPLYING A PLURALITY OF ENERGY BEAMS IN ADDITIVE MANUFACTURING

CROSS REFERENCE TO RELATED APPLICATIONS

This application is the US National Stage of International Application No. PCT/EP2020/071468 filed 30 Jul. 2020, and claims the benefit thereof. The International Application claims the benefit of European Application No. EP19202655 filed 11 Oct. 2019. All of the applications are incorporated by reference herein in their entirety.

FIELD OF INVENTION

The present invention concerns a method of applying a plurality of energy beams, such as at least two different laser and/or electron beam(s) in the additive manufacture of a component. Further, the present invention relates to a method of manufacturing, a computer program product, a control device and a corresponding manufacturing device.

Particularly, the component denotes a high-performance component, such as a component applied in the power generation, aerospace or automotive sector. More advantageously, the component is a component of a turbo machine, e.g. in the flow path hardware of a gas turbine. The component is, thus, advantageously made of a nickel- or cobalt-based superalloy, particularly a precipitation-hardened alloy.

BACKGROUND OF INVENTION

Additive manufacturing techniques comprise e.g. powder-bed-fusion methods, such as selective laser melting (SLM), selective laser sintering (SLS) or electron beam melting (EBM).

A method of selective laser melting is described in EP 2 601 006 B1, for example.

Additive manufacturing, particularly powder bed fusion (PBF) methods have already proven to be useful and advantageous in the fabrication of prototypes or complex components, such as components with a mazelike or filigree structure or functionally cooled components. Further, the additive manufacture stands out for its short chain of process steps which in turn enables material economization and a particularly low lead time.

Powder-bed-fusion methods are even suitable or predestined for an industrial production of the above-mentioned components.

Further additive manufacturing approaches relate to "Directed Energy Deposition (DED)", such as laser cladding, electron beam or plasma welding, metal inkjet molding (MIM), so-called sheet lamination methods, thermal spraying (VPS LPPS) or gas dynamic cold spraying (GDCS).

Corresponding apparatuses or setups for the given methods usually comprise a manufacturing or build platform on which the component is built layer-by-layer after the feeding of a layer of base material which may then be melted, e.g. by an energy beam, such as a laser, and subsequently solidified. The layer thickness is determined by a recoater that moves, e.g. automatically, over the powder bed and removes excess material from a manufacturing plane or build space. Typical layer thicknesses amount to between 20 μm and 40 μm. During the manufacture, said energy beam scans over the surface and melts the powder on selected areas which may be predetermined by a CAD-file according to the desired geometry of the component to be manufactured. Said scanning or irradiation is advantageously carried out in a computer-implemented way or via computer aided means, such as computer aided manufacturing (CAM) instructions, which may be present in the form of a dataset. Said dataset or CAM-file may be or refer to a computer program or computer program product.

The information or data defined by said computer program product or CAM-file advantageously relates to a tool path or irradiation pattern according to which an additive manufacturing processor or device may perform a subsequent irradiation.

Means for selective solidification in a selective laser melting process employing multiple laser beams is e.g. described in EP 3 007 879 B1.

Further, EP 3 351 323 A1 describes an additive manufacturing apparatus with systems of inbuilt assessment and correction of laser pointing accuracy for multi-laser devices.

Particularly the selective laser melting process produces a solid geometry by fully melting of a, e.g. metal, powder using a laser in an inert gas environment. The surface generated or exposed on overhanging regions of the part inherently comprise a large surface roughness. This is because the melt pool, each laser or energy beam generates in the powder bed, partly extends into the powder below the respective overhanging region, structure or geometry. Said overlap of the melt pool with the powder the large roughness of corresponding side faces of the component, thus, depend also on an angle of incidence of the energy beam with regard to the predetermined geometry of the component.

Even though large and undesired roughness may be reduced by post-machining or other approaches, there is the strong need to improve roughness is in-situ during the build-up process, as this renders complex post-processing and further approaches for an improvement of dimensional accuracy of the respective component needless.

SUMMARY OF INVENTION

It is therefore an object of the present invention to provide means by which an unintended and adverse solidification results, such as by melt pool interaction with loose powder, below an overhanging region of the component during its manufacture, can advantageously be reduced or avoided.

The mentioned object is achieved by the subject-matters of the independent claims. Advantageous embodiments are subject-matter of the dependent claims.

An aspect of the present invention relates to a method of applying a plurality of energy beams, such as one or a plurality of laser or electron beam(s), in or for the additive manufacture of a component or part to be manufactured. Said manufacture advantageously concerns powder bed fusion or powder-bed-based approaches.

Such energy beams may expediently be provided or emitted by a beam source as known in the prior art.

The method further comprises providing a first energy beam and a, further, second energy beam, each being set up for the irradiation of a layer of a powder bed, wherein the first beam is provided, intended or disposed to scan over a first irradiation area, and the second energy beam is provided to scan over a second irradiation area, wherein the first irradiation area and the second irradiation area are substantially arranged adjacent to each other and both form part of a manufacturing plane.

The method further comprises assigning a scan vector to be scanned, followed or executed in the first irradiation area for the manufacture of the component by the second energy beam, if a melt pool generated by the second energy beam during the scan of the vector is expected to cause less overlap with a powder bed outside of the component's geometry than a melt pool generated by the first energy beam would cause during the scan of said scan vector.

The term "geometry" as used herein may relate to a mere geometric model of the component, such as provided by a CAD file.

Additionally or alternatively, the geometry may relate to a solid or physical structure already being fully or partly established in or during the manufacturing process.

Thus, an instruction is given of how to reduce an adverse impact of the melt pool of the given vector in a multi-laser additive manufacturing process or system. Consequently, resulting faces or sides of the component can be provided with a far improved surface quality, such as with a reduced roughness and deformation. Thereby, in turn, a dimensional accuracy of the component can be improved. In this course, it is evident that also the component's structural properties can be improved.

Actually, a solution is provided which helps to overcome one of the major drawbacks of current additive (powder-bed-based) manufacturing technology. As overhanging structures pose the major challenges in additive manufacturing, the present invention generally allows to increase design freedom of said emerging technology.

In an embodiment, said scan vector is assigned to the second energy beam if the second energy beam forms or includes a smaller angle with a normal of a geometry or structure, such as that of a layer to be manufactured in a proximate step, than the first energy beam would form with said normal.

The term "normal" may relate to a line or vector which is perpendicular to a given object or tangent line of said object.

In an embodiment, the scan vector is assigned to the second energy beam if the second energy beam forms a smaller angle with an axis of main extension of an overhang of a structure than the first energy beam would form with said axis.

In an embodiment, the scan vector is a contour vector or a vector close to the contour of the component or its structure or geometry. The inventive advantages manifest particularly if said vector is a contour vector. Nevertheless, the inventive advantages can also significantly be exploited when said scan vector is e.g. a surface or so-called hatching vector in the additive manufacture of the component.

In an embodiment, the scan vector is a vector of a so-called downskin surfaces. According to this embodiment, the structure which is to be established by scanning or irradiation of the scan vector, is an overhanging structure or overhanging region of the component.

In an embodiment, the scan vector is a so-called "inskin" or vector of an inskin surface.

In an embodiment, the scan vector is an upskin vector or vector of an upskin surface.

In an embodiment, the assigning is part of a CAM—(computer aided manufacturing) method.

In an embodiment, the first and the second irradiation area only partly overlap. This embodiment represents a usual situation in state-of-the-art multi laser additive manufacturing machines, wherein a certain overlap of those areas which are assigned to the single lasers has to be provided.

In an embodiment, the geometry of the component extends at least partly in the area of overlap of the first and the second irradiation area.

In an embodiment, the component is manufactured by layerwise irradiation of a powder layer according to the assigned scan vector. To this effect, an aspect of the present invention is provided by an according additive manufacturing method.

In an embodiment, a beam focus of the second energy beam is adjusted according to an extended or varied path length as a consequence of the scan vector being assigned to be scanned in the first irradiation area to the second energy beam. Additionally, according to this embodiment, also the first energy beam or its focus may be adjusted according to a varied path length.

In an embodiment, the first and the second energy beam each constitute a laser beam.

In an embodiment, the first and the second energy beam each constitute an electron beam.

In an embodiment, the first energy beam constitutes a laser beam, and the second energy beam constitutes an electron beam, or vice versa.

A further aspect of the present invention relates to a computer program or computer program product, comprising instructions which, when a corresponding program is executed by a computer or data processing unit, cause said computer or device to carry out the assigning as described above.

A computer program product as referred to herein may relate to a computer program means constituting or comprising a storage medium like a memory card, a USB stick, a CD-ROM, a DVD or a file downloaded or downloadable from a server or network. Such product may be provided by a wireless communication network or via transfer of the corresponding information by the given computer program, computer program product or computer program means. A computer program product may further include a non-transitory computer-readable storage medium storing applications, programs, program modules, scripts, source code, program code, object code, byte code, compiled code, interpreted code, machine code, executable instructions, and/or the like.

A further aspect of the present invention relates to a control device for controlling a plurality of energy beams, wherein the control device is adapted to carry out the assigning of the scan vector as described above.

A further aspect of the present invention relates to a manufacturing device comprising the control device, further comprising a first beam source for emitting or applying the first energy beam and a second beam source for emitting the second energy beam, and particularly further comprising a further third and a fourth energy beam source for emitting or applying a third and fourth energy beam.

Advantages and embodiments relating to the described and/or the described computer program (product) may as well pertain or be valid with regard to the claimed control device and/or the manufacturing device as described.

BRIEF DESCRIPTION OF THE DRAWINGS

Further features, expediencies and advantages become apparent from the following description of the exemplary embodiment in connection with the Figures.

DETAILED DESCRIPTION OF INVENTION

Like elements, elements of the same kind and identically acting elements may be provided with the same reference numerals in the Figures. The Figures are not necessarily depicted true to scale and may be scaled up or down to allow for a better understanding of the illustrated principles. Rather, the described Figures are to be construed in a broad sense and as a qualitative base which allows a person skilled in the art to apply the presented teaching in a versatile way.

The term "and/or" as used herein shall mean that each of the listed elements may be taken alone or in conjunction with two or more of further listed elements.

Figure 1:
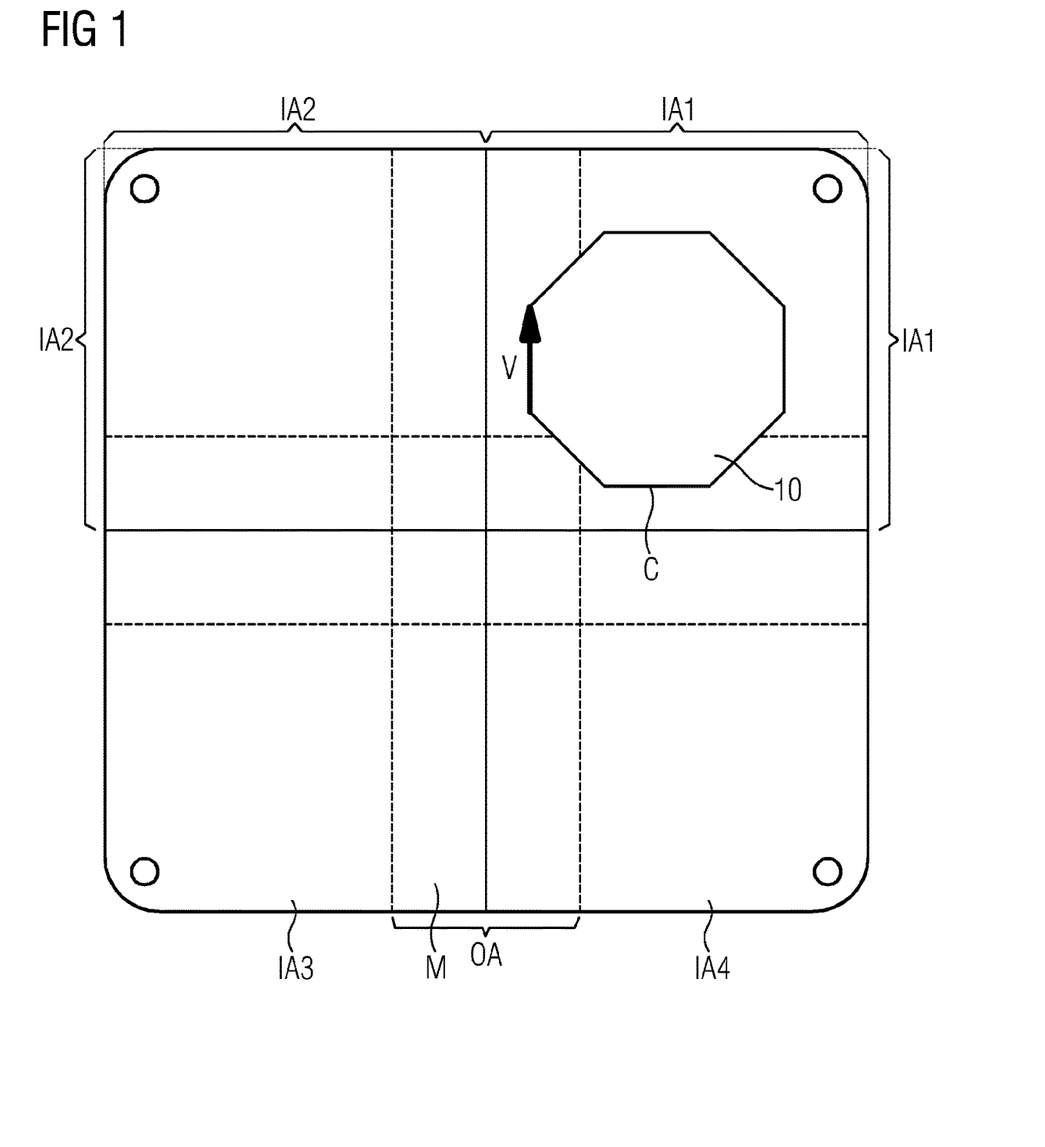
FIG. 1 indicates a schematic top view of a manufacturing plane as well as a scan vector in an additive manufacturing process.

FIG. 1 shows a schematic top view of a manufacturing plane M. On the manufacturing plane M, a component 10 may advantageously be established or build-up additively out of a powder bed (cf. reference numeral P in the Figures described in the following). Said manufacturing process for establishing the component 10 is advantageously a selective laser melting or electron beam melting process. Accordingly, an additive manufacturing device (cf. reference numeral 100 in the following Figures) expediently comprises at least two energy sources, such as a source for emitting an energy beam, like a laser or an electron beam.

The embodiment of the manufacturing plane M of FIG. 1 indicates e.g. four quadrants or irradiation areas (cf. reference numerals IA1, IA2, IA3 and IA4), each of said irradiation areas is set up for being exposed to an energy beam for the buildup of the component 10. To this effect, the present manufacturing device 100 may represent a multi laser or multibeam device. In addition, the present invention is predominantly directed to multi-laser approaches.

It is shown that the irradiation areas IA1 and IA2 only partly overlap in an overlapping area OA. Said overlapping area OA has a cross-like regular shape. Even though this is not explicitly indicated, the irradiation areas which are arranged in a square like fashion may also form different shapes of overlaps.

The first irradiation area IA1 in the upper right part of FIG. 1 comprises a cross-section of the component 10. Furthermore, a contour C of the component 10 is indicated. During its layerwise or additive buildup, the component 10 may advantageously be irradiated with the first energy beam in the first irradiation area IA1.

For its buildup, a hatching vector (not explicitly indicated) as well as a contour vector V has to be assigned for the irradiation and solidification of the contour C of the component 10, such as via computer-aided-manufacturing means, prior to the physical buildup.

In the exemplary embodiment as shown in FIG. 1, the component 10 comprises an octagon-like cross section which at least partly extends in the mentioned overlapping area OA of the first irradiation area IA1 with the second irradiation area IA2 and the fourth irradiation area IA4.

Figure 2:
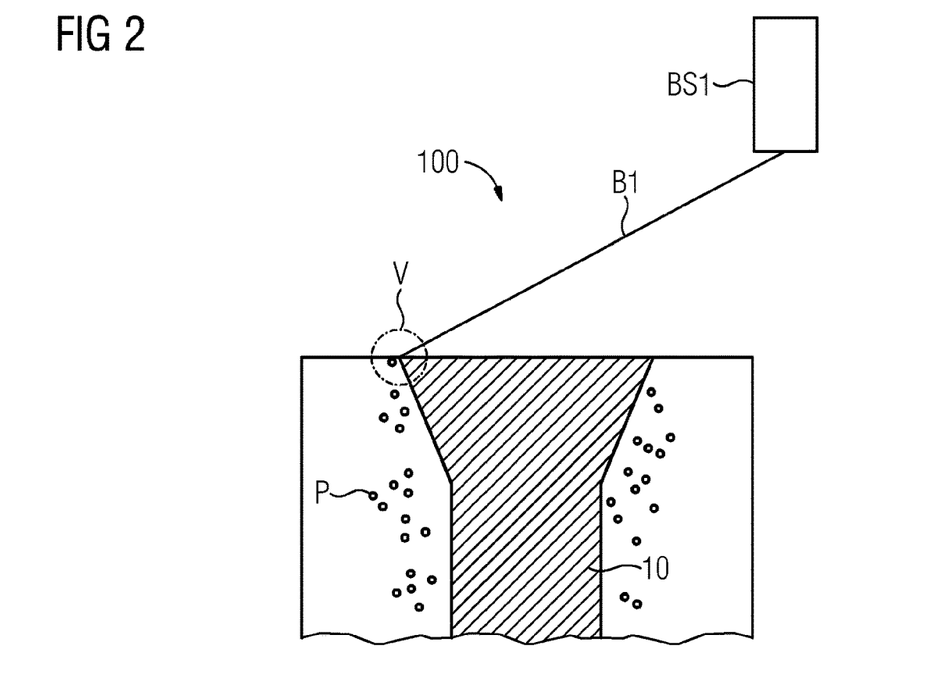
FIG. 2 indicates, in a schematic side view, a pathway of a first laser in an additive manufacturing process.

FIG. 2 indicates, in a schematic side view, a component 10 during its additive manufacture by selective laser melting. The component 10 comprises on both lateral sides an overhang O.

It is well known in the art that establishing such overhangs out of a powder bed P is difficult due to a lack of mechanical support as well due to a deficient heat output directly under the overhanging section of the component 10.

The component 10 indicated in FIG. 1 is advantageously disposed in the first irradiation area IA1. Further, the first energy beam B1, such as an electron or laser beam, is emitted from the first beam source BS1.

Said energy beam B1 is advantageously provided to irradiate the manufacturing plane M or the powder bed P in the first irradiation area IA1. Accordingly, any scan vector for the irradiation and the solidification of any layer for the component 10 is usually assigned to or to be scanned by the first energy beam B1.

This assigning may e.g. be provided in a process planning step, such as a computer-aided-manufacturing step prior to the physical build-up of the component 10 in an additive manufacturing device 100. In the situation shown in FIG. 2, the vector V represents a contour vector or vector close to the contour of the component 10.

Figure 3:
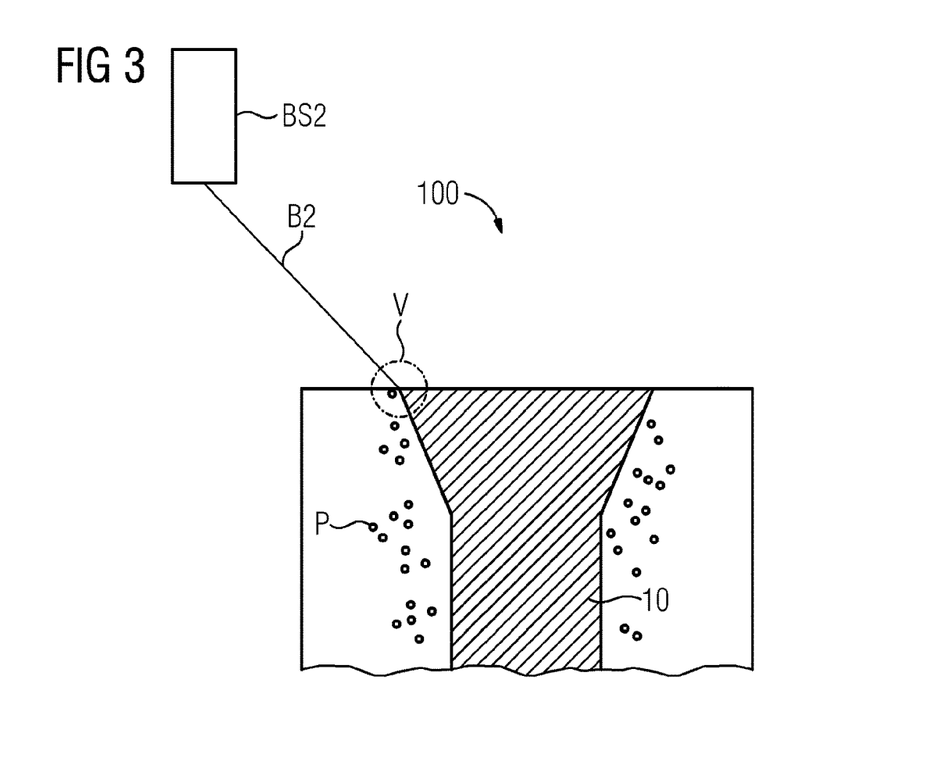
FIG. 3 indicates, in a schematic side view, a pathway of a second laser in an additive manufacturing process.

FIG. 3 shows a situation analogue to FIG. 2, wherein, however, the vector V is assigned to be scanned by a second energy beam B2, such as a laser or an electron beam. The second energy beam B2 is expediently emitted from a second beam source BS2. It is shown that—in contrast to the situation of FIG. 2—the second energy beam B2 or a corresponding beam direction is much better aligned with an axis of main extension (cf. reference numeral N below) of the overhang comprising said vector V.

Figure 4:
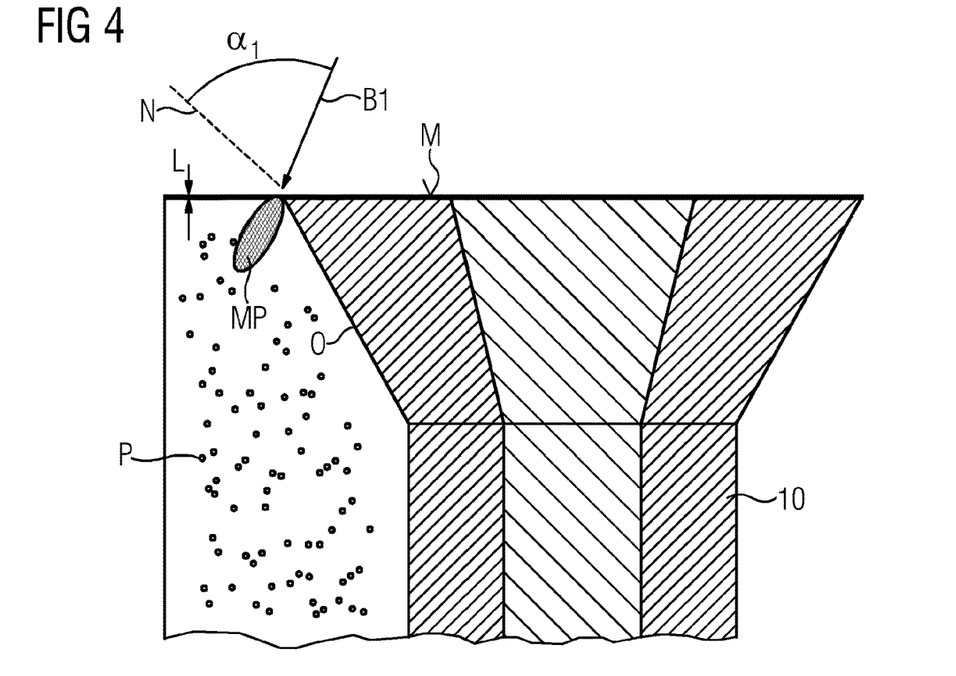
FIG. 4 indicates an incidence of the first laser in greater detail as compared to FIG. 2.

FIG. 4 shows a part of the component 10 as shown in FIG. 2 in greater detail. It is further shown, that the first energy beam B1 forms or encloses an angle of $\alpha 1$ with a normal or normal direction N. Said normal N constitutes a normal of the contour or edge of the component 10. Said normal N may as well constitute an angle of main extension of an overhanging section O of the component 10.

It is further shown that the energy beam B1 generates a melt pool MP which extends or overlaps—due to the overhanging geometry of the component 10—largely into a powder bed or powder region outside of the component's (intended) geometry or structure. A layer thickness is further indicated with reference numeral L in FIG. 4. Said indicated thickness is not true to scale and may amount to between 20 µm and 40 µm, for example. The melt pool dimension, particularly its vertical extension may e.g. amount to three or four times the layer thickness L.

Figure 5:
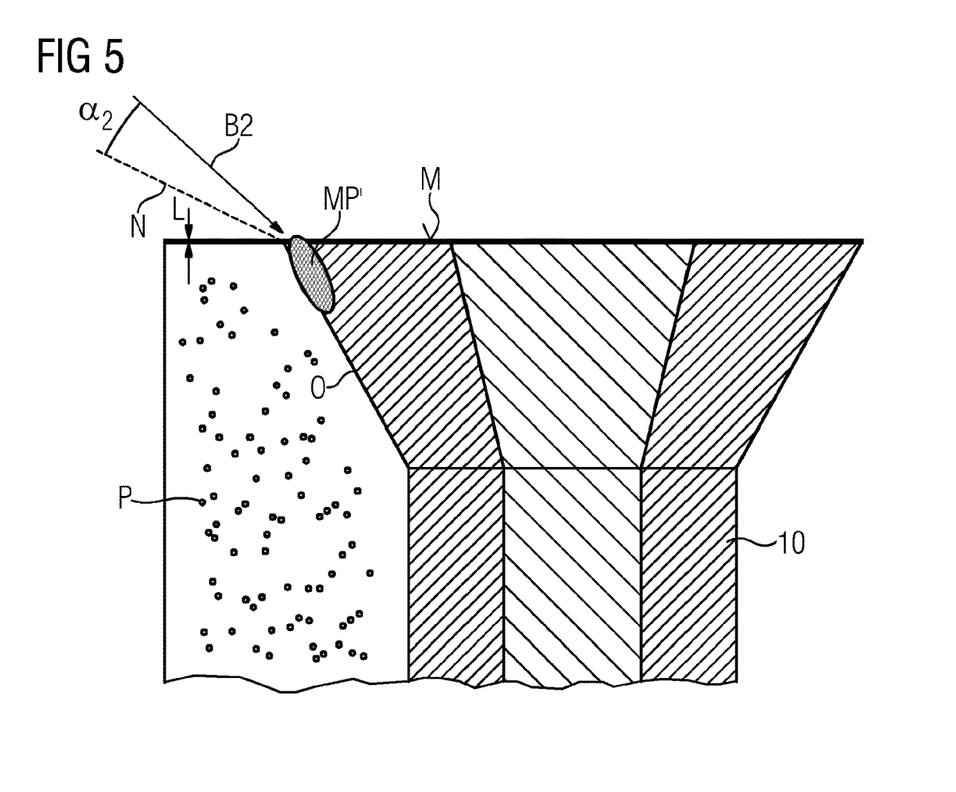
FIG. 5 indicates an incidence of the second laser in greater detail as compared to FIG. 3.

FIG. 5 shows a part of the component 10 as shown in FIG. 3 in greater detail. In contrast to the indication of FIG. 4, the second energy beam B2 is much better aligned to the components contour or overhang in terms of a solidification result. In other words, the melt pool MP' generated by the second energy beam causes a much smaller overlap with a powdery region. The melt pool MP' particularly resides inside of the component's structure or geometry. In other words, the second energy beam B2 forms or encloses an angle $\alpha 2$ with said normal N which is much smaller than the mentioned angle $\alpha 1$ (cf. FIG. 4).

Further, as said normal may as well constitute an axis of main extension of the overhang as described by way of FIG. 4, the second energy beam B2, of course, also forms, a smaller angle with said axis of main extension.

In this way, it is advantageous, according to the present invention to assign a scan vector, such as the described vector V, to be scanned by the second energy beam B2, as described by way of FIGS. 3 and 5. This assignment may as well be performed in a preparation step of the actual build up by way of computer aided manufacturing means.

With reference to FIG. 1 it is apparent that the second energy beam B2, being conventionally or originally disposed for the irradiation of the second irradiation area IA2, may serve for the irradiation of the vector, even though said vector V is rather arranged in the first irradiation area. Thereby, the problems connected to the manufacture of overhangs in the given powder bed processes may be circumvented. Admittedly, said laser beam may have a greater or extended path length in the devices manufacturing chamber. In order to account for any defocusing, the focus of the respective beam focus may be (re)adjusted.

Figure 6:
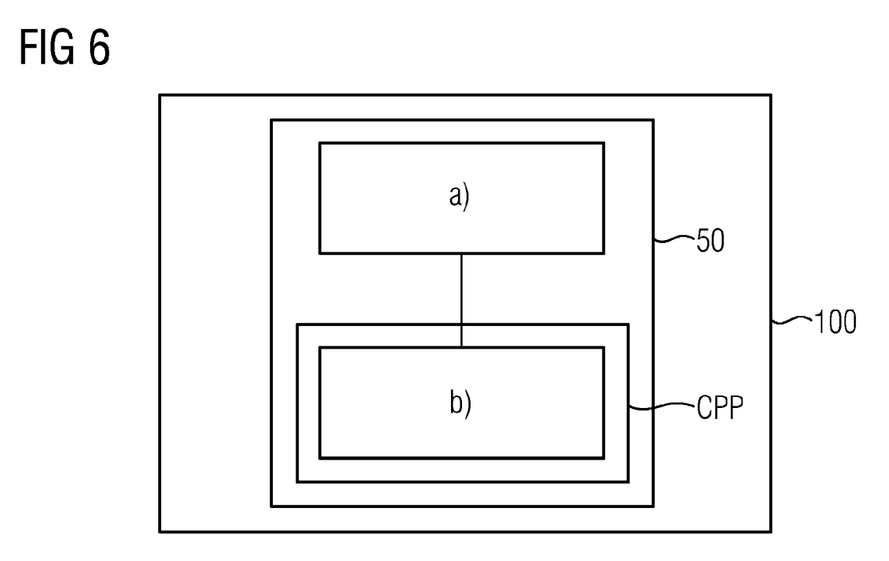
FIG. 6 indicates, in a schematic simplified flowchart, method steps of the present invention.

FIG. 6 finally indicates—by way of a schematic flow chart—method steps according to the present invention. Said method is a method of applying or controlling a plurality of energy beams B1, B2 in the additive manufacture of said component 10.

The method comprises, a), providing the first energy beam B1 and, separately, the second energy beam B2, each being set up for the irradiation of a layer L of a powder bed P, wherein the first beam B1 is provided to scan over the first irradiation IA1 area and the second energy beam B2 is provided to scan over the second irradiation area IA2, wherein the first irradiation area IA1 and the second irradiation area IA2 are substantially arranged adjacent to each other and both form part of the manufacturing plane M.

Further, the method comprises, b), assigning the scan vector V to be scanned in the first irradiation area IA1 for the manufacture of the component 10 by the second energy beam B2, if a melt pool MP' generated by the second energy beam B2 during the scan of the vector V is expected to cause less overlap with a powder bed P outside of the component's geometry than a melt pool MP generated by the first energy beam B1 would cause during the scan of said vector V (cf. above).

It is further indicated in FIG. 6 that particularly the step of assigning may be carried out by a computer program or computer program product CPP, which e.g. comprises instructions which, when a corresponding program is executed by a computer, cause the computer to carry out the mentioned assigning step b).

The inventive method may as well be implemented or carried out without any computer implementation, data processing or software means. To this effect, the invention may as well be carried out by a hardware, such as a so-called field programmable gate array (FPGA) and/or a control device 50 for controlling a plurality of or at least two different energy beams, wherein the control device 50 is adapted to carry out the assigning of the scan vector V as described.

The inventive advantages may further manifest in the whole manufacturing device or system 100, e.g. comprising the control device 50 and possibly further comprising a first beam source BS1 for emitting the first energy beam B1 and a second beam source BS2 for emitting the second energy beam B2, and particularly further comprising a further third and a fourth energy beam source for emitting a third and a fourth energy beam (not explicitly indicated).

The component as referred to herein may particularly relate to a part or an article of complex shape, such as with filigree portions of structures. Preferably, said component is made of a high-performance material, such as a material of great strength and/or thermal resistivity. Particularly, said part may constitute a part of a steam or gas turbine component, such as a blade, vane, shroud, shield, such as heat shield, tip, ring segment, insert, injector, seal, transition, burner, nozzle, strainer, orifice, liner, distributor, dome, boost, cone, lance, plate, resonator, piston or any corresponding retrofit kit. Alternatively, said component may relate to another or similar component.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. A method of applying a plurality of energy beams for additive manufacture of a component, comprising:
   a) providing a first energy beam and a further, second energy beam, each being set up for irradiation of a layer of a powder bed, wherein the first energy beam is provided to scan over a first irradiation area and the second energy beam is provided to scan over a second irradiation area, wherein the first irradiation area and the second irradiation area are arranged adjacent to each other and both form part of a manufacturing plane, and
   b) assigning a scan vector to be scanned in the first irradiation area for the additive manufacture of the component by the second energy beam, when a melt pool generated by the second energy beam during a scan of the scan vector is expected to cause less overlap with the powder bed outside of a geometry of the component than a melt pool generated by the first energy beam would cause during the scan of said scan vector wherein said scan vector is assigned to the second energy beam if the second energy beam forms a smaller angle with a normal of a structure than the first energy beam would form with said normal.

2. The method according to claim 1, wherein said scan vector is assigned to the second energy beam when the second energy beam forms a smaller angle with an axis of main extension of an overhang of a structure than the first energy beam would form with said axis.

3. The method according to claim 1, wherein the scan vector is a contour vector of the component.

4. The method according to claim 1, wherein the assigning is part of a CAM-method.

5. The method according to claim 1, wherein the first and second irradiation area only partly overlap.

6. The method according to claim 5, wherein a geometry of the component extends at least partly in an area of overlap of the first and the second irradiation area.

7. The method according to claim 1, wherein the component is manufactured by layerwise irradiation of a powder layer according to the scan vector(s) assigned.

8. The method according to claim 7, wherein a beam focus of the second energy beam is adjusted according to an extended path length as a consequence of the scan vector assigned to be scanned in the first irradiation area to the second energy beam.

9. The method according to claim 1, wherein the first and the second energy beam each constitute a laser beam.

10. The method according to claim 1, wherein the first and the second energy beam each constitute an electron beam.

11. The method according to claim 1, wherein the first energy beam constitutes a laser beam and the second energy beam constitutes an electron beam, or vice versa.

12. A computer program product stored on a non-transitory computer readable media, comprising:
instructions which, when executed by a computer, cause the computer to carry out the method of claim 1.

13. A control device for controlling a plurality of energy beams,
wherein the control device is adapted to carry out the method of claim 1.

14. A manufacturing device, comprising:
the control device according to claim 13,
a first beam source for emitting the first energy beam and a second beam source for emitting the second energy beam.

15. The manufacturing device of claim 14, further comprising:
a third and a fourth energy beam source.

\* \* \* \* \*